_US005818912A_

United States Patent [19]
Hammond

[11] Patent Number: 5,818,912
[45] Date of Patent: Oct. 6, 1998

[54] FULLY DIGITAL CALL PROCESSING PLATFORM

[75] Inventor: Daniel D. Hammond, Dallas, Tex.

[73] Assignee: InterVoice Limited Partnership, Reno, Nev.

[21] Appl. No.: 551,538

[22] Filed: Nov. 1, 1995

Related U.S. Application Data

[63] Continuation of Ser. No. 261,675, Jun. 20, 1994, abandoned, which is a continuation of Ser. No. 850,389, Mar. 11, 1992, abandoned.

[51] Int. Cl.$^6$ ................................................. H04M 11/00
[52] U.S. Cl. ................................... 379/94.05; 379/93.06; 379/93.28
[58] Field of Search ................................. 379/93, 94, 96, 379/97, 98, 100, 88, 89, 67, 95, 387, 93.05, 93.06, 93.08; 370/110.1, 94.1

[56] References Cited

U.S. PATENT DOCUMENTS

| | | | |
|---|---|---|---|
| 4,677,659 | 6/1987 | Dargan | 379/96 |
| 4,853,952 | 8/1989 | Jachmann et al. | 379/94 |
| 4,899,358 | 2/1990 | Blakley | 379/88 |
| 4,908,850 | 3/1990 | Masson et al. | 379/88 |
| 4,934,954 | 6/1990 | Thompson et al. | 379/94 |
| 4,998,248 | 3/1991 | Matsuzaki | 370/94.1 |
| 5,036,533 | 7/1991 | Carter et al. | 379/88 |
| 5,103,449 | 4/1992 | Jolissaint | 370/110.1 |
| 5,113,430 | 5/1992 | Richardson, Jr. et al. | 379/67 |
| 5,134,647 | 7/1992 | Pugh et al. | 379/88 |
| 5,181,237 | 1/1993 | Dowden et al. | 379/88 |
| 5,187,735 | 2/1993 | Hernero et al. | 379/67 |
| 5,193,110 | 3/1993 | Jones et al. | 379/94 |
| 5,199,062 | 3/1993 | Vonn Meister et al. | 379/89 |
| 5,210,740 | 5/1993 | Anzai et al. | 379/94 |

Primary Examiner—Stella Woo
Attorney, Agent, or Firm—Fulbright & Jaworski L.L.P.

[57] ABSTRACT

A fully digital voice response system is disclosed. The system comprises a digital processor and a circuit for coupling the digital processor to a digital computer and a digital telephone network, the coupling circuit being a fully digital communications path. The system receives digital data from an instrument coupled to the digital telephone network, translates the received data into a digital computer query and transmits the query to the digital computer via the digital telephone network. The processor also receives digital data from the digital computer, translates the digital data into digital data representing a voice, facsimile or data for a digital computer and transmits the data via digital telephone lines to the instrument. In this manner, the system receives a command from a person and responds to the command with data retrieved from the digital computer, the system presenting the data to the person in voice or facsimile form or in a form suitable for reception by another digital computer. Because the system operates entirely with data in digital form, it is free from the slowness, inefficiency, error and infidelity inherent in fully analog or hybrid analog/digital systems.

60 Claims, 1 Drawing Sheet

FULLY DIGITAL CALL PROCESSING PLATFORM

This is a continuation of application Ser. No. 08/261,675, filed on Jun. 20, 1994, which is a continuation of Ser. No. 07/850,389, filed on Mar. 11, 1992, both now abandoned.

TECHNICAL FIELD OF THE INVENTION

This invention relates to an all-digital voice processing system. More specifically, this invention relates to use of a digital voice processor with a digital computer and a digital telephone network to thereby provide a fully digital voice response system.

BACKGROUND OF THE INVENTION

Voice response systems, in the general sense, are not new. For years, systems have existed which are designed to take information from and give information to persons by means of an ordinary telephone instrument.

In a typical example, a person may wish to know the balance of his checking account. In the not-too-distant past, the person would have had to place a telephone call to the bank, where a teller or other bank employee queried the bank's central database to find the answer and communicated the answer orally back to the person. Of course, such a system depended upon having a bank employee free to perform the duty. There may be times where the employee would be overworked due to high demand for account balances and periods notable for sheer boredom when no calls would be received.

Years ago, a vastly superior system was developed using as its cornerstone a voice response unit ("VRU"). The system comprised: 1) a pulse or dual tone multifrequency detector ("DTMF"), which received a signal over a telephone line representing pulses or tones from a telephone instrument, decoding the pulses or tones into an electronically friendly format, or 2) a voice recognition unit, which received a signal over a telephone line representing a person's voice, translating the voice into an electronically friendly format. The electronically friendly format was suitable for use by other electronic equipment.

In the context of the example outlined above, a person wishing to know his checking account balance would have had to telephone the bank. A system comprising a VRU would have answered, directing the customer to dial in or speak his name, account number, password or other required or desired information. In response to the person's dialed or vocal information and commands, the VRU produced a digital computer command which was fed to a computer database to retrieve the desired account balance information. The VRU then translated the account balance information retrieved from the computer in digital form into voice and transmitted that voice back to the person, who then had his question answered. This voice response system represented a quantum leap in customer service and is widely used.

However, as good as they were, these systems had certain shortcomings. First, they were designed to interface with old-style analog telephone exchanges, whereby the person's voice, pulse or tone command had to pass through a coder/decoder ("CODEC"), which translated the analog's signal carrying the person's command into a digital signal carrying the same. The signal was then passed to the system. The system formulated a digital computer query from the command. However, prior to actually querying a digital computer database through the network, the network required conversion of the digital computer query back to analog form, conversion being performed by a modulator/demodulator ("MODEM"). The query was then transmitted back through the analog telephone network to the digital computer. However, prior to the query being given to the computer it had to be converted back to digital form via another MODEM. Once the computer database produced its answer to the person's query, the answer, in the form of digital data, had to be modulated back to analog form with a MODEM, sent through the analog telephone network, demodulated back to digital form with a MODEM, processed by the VRU into a voice answer and, finally, processed through a CODEC into analog form for transmission to the person by the analog telephone network.

All of this conversion to and from analog and digital forms not only gave rise to high rates of error, but limited the capacity of these voice response systems to handle information due to the limitations inherent in transmission of data in analog form over telephone lines.

Another problem encountered was loss of fidelity, as data was converted, amplified, transmitted, multiplexed and filtered. All of these processes eroded data integrity and degraded fidelity, often beyond reasonable limits. This loss of fidelity affected voice data to a particularly great extent, but it also affected the transmission of pulses or tones, sometimes rendering them undecodable.

To solve the problem inherent in processing of analog data, telephone companies have been replacing analog telephone exchanges with digital telephone exchanges. These digital telephone exchanges allow for much more rapid transmission of voice and data with a much lower error rate and greater fidelity. A digital signal can pass through a digital telephone network and over long lines to another digital telephone network without any degradation in signal quality. Therefore, both voice and data maintain greater fidelity in such systems.

The system described above has, in part, been adapted to mesh with a digital telephone network. With such improved systems, a person desiring to know his checking account balance placed a telephone call to the bank by dialing, typically, an analog telephone instrument which was coupled to the digital telephone network via a CODEC. The person's voice, once digitized by the CODEC reached the above-described system in its digitized form, without reprocessing by a CODEC. The VRU then responded by developing a digital computer query. However, the digital computer query had to pass through MODEMs and analog lines to reach the digital computer being queried. Hence, many of the disadvantages of the first-described system were retained, namely multiple conversion to and from analog and digital form.

Each of these prior art systems failed in their own ways to take full advantage of the capabilities of a digital telephone network and digital data processing in general, thereby severely restricting their ability to handle voice response applications with the speed, efficiency and fidelity associated with digital telephone communications. In other words, all of the aforementioned systems fell short of being fully digital voice automation platforms. The present invention is the first to take full advantage of the capabilities a digital telephone network has and is the first such system to eliminate the need for CODECs, MODEMs, and other analog/digital conversion apparatus.

SUMMARY OF THE INVENTION

It is therefore a primary object of this invention to provide a telephone system for providing voice response communications which is fully digital. Accordingly, the invention provides a telephone system comprising a digital voice processor and circuits for coupling the digital voice processor to a digital computer and an instrument via a digital telephone network, the coupling circuit being a fully digital communications path.

Another object of the invention is to provide a telephone system wherein the coupling circuit comprises a first fully digital communications path to the digital telephone network.

A further object of the invention is to provide a telephone system wherein the coupling circuit comprises a second fully digital communications path to the digital computer.

A still further object of the invention is to provide a telephone system wherein the system receives digital data from the digital telephone network, translates the received digital data into a digital query and transmits the query to the digital computer.

Yet a further object of the invention is to provide a telephone system wherein the digital voice processor receives digital data from the digital computer, translates the digital data into digital data representing a voice and transmits the voice data to the instrument via the digital telephone network.

Still another object of the invention is to provide a telephone system wherein the fully digital communications path comprises a multichannel digital telephone trunk.

Yet another object of the invention is to provide a telephone system wherein the trunk is a T1 trunk.

Another object of the invention is to provide a telephone system wherein the system receives a command from a person and responds to the command with data retrieved from the digital computer, the system presenting the data to a person in voice form.

Still yet another object of the invention is to provide a telephone system wherein the system includes a circuit for placing outbound calls via the digital telephone network.

Another object of the invention is to provide a method of communicating with the digital computer comprising the steps of receiving digital data from a digital telephone network via a first fully digital communications path, translating the received digital data into a digital computer query with a digital voice processor and transmitting the query through the digital computer via a second fully digital communications path.

Yet another object of the invention is to provide a method of communicating with a digital computer further comprising the steps of responding to the received digital data with data retrieved from the digital computer and presenting the data in voice form.

Yet another object of the invention is to provide a method of communicating with a digital computer wherein the steps of responding and presenting comprise the steps of receiving digital data from the digital computer, translating the digital data into digital data representing a voice and transmitting the voice data to the instrument via the digital telephone network.

Still yet another object of the invention is to provide a method of communicating with a digital computer wherein the fully digital communications path comprises a multichannel digital telephone trunk.

Still another object of the invention is to provide a method of communicating with a digital computer wherein the trunk is a T1 trunk in a preferred embodiment.

And another object of the invention is to provide a method of communicating with a digital computer further comprising the step of placing outbound calls via the digital telephone network.

In the attainment of the foregoing objectives, the apparatus which encompasses the preferred embodiment of the invention is a telephone system comprising a digital voice processor, means for coupling the digital voice processor to a digital computer and a digital telephone network, the coupling means being a fully digital communications path. The path comprises a first fully digital communications path to an instrument via the digital telephone network and a second fully digital communications path to the digital computer. The digital voice processor receives digital data from the digital telephone network, translates the received digital data into a digital computer query and transmits the query to the digital computer. The digital voice processor also receives digital data from the digital computer, translates the digital data into digital data representing a voice and transmits the voice data to the instrument via the digital telephone network. In the preferred embodiment, the fully digital communications path comprises a multichannel digital telephone trunk which may be a T1 trunk. The system thereby receives a command from a person and responds to the command with data retrieved from the digital computer, the system presenting the data to the person in voice form. Finally, the system includes means for placing outbound calls via the digital telephone network.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Other objects and advantages of the present invention will be apparent upon reference to the accompanying description when taken in conjunction with the following drawings.

DETAILED DESCRIPTION OF THE INVENTION

Figure 1:
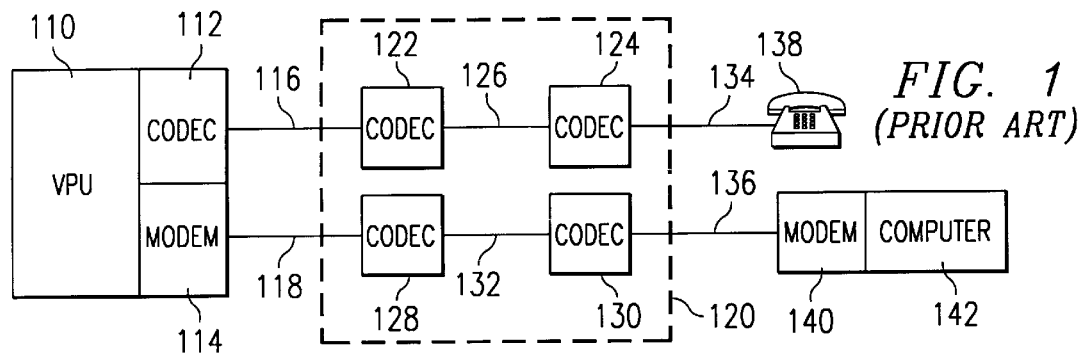
FIG. 1 is a block diagram of a prior art voice response system adapted for use with an analog telephone network.

FIG. 1 is a block diagram of a prior art voice response system adapted for use with an analog telephone network. The system comprises a voice processing unit ("VPU") 110 coupled to a coder/decoder ("CODEC") 112 and modulator/demodulator ("MODEM") 114. The CODEC 112 and MODEM 114 are coupled via conventional analog telephone lines 116, 118 to a telephone network 120. The telephone network 120 receives the analog lines 116, 118 converting the signals thereon to digital form by CODECs 122, 128, delivering the digital signals via digital lines 126, 132 to CODECs 124, 130, where the signals are converted back to analog form. A conventional telephone instrument 138 is coupled via analog line 134 to CODEC 124 in the network 120. A standard digital computer 142 is coupled to analog line 136 via MODEM 140.

Using the example presented in the background of the invention, if a person wishes to know the balance of his checking account, he would have had to place a telephone call to his bank. Accordingly, he would dial the bank's telephone number on telephone instrument 138. His voice would be transmitted along analog line 134 to CODEC 124, where it would be digitized. The digital representation of his voice would travel along digital line 126 to CODEC 122 where it would be converted back to analog form and transmitted via analog line 116 to CODEC 112, where it would again be digitized. The VPU 110 would process the person's commands, whether they be given by tone, pulse or voice, converting them into computer-readable commands. These commands would be converted to analog signal form by MODEM 114 and travel along analog line 118 through CODEC 128, digital line 132, CODEC 130, analog line 136 and MODEM 140 to computer 142, where the command would be processed and inquiry made to a database containing the person's account balance within computer 142. An answer from the computer 142, in the form of the person's account balance travels back to the VPU 110 through all of the intervening hardware, where it is converted back to a mechanically synthesized voice form and presented to the caller via telephone instrument 138.

Figure 2:
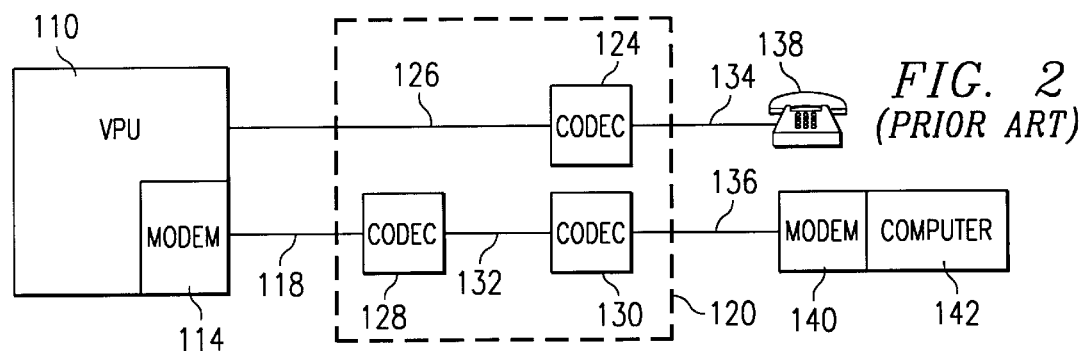
FIG. 2 is a block diagram of a prior art voice response system partially adapted for use with a digital telephone network.

FIG. 2 is a block diagram of a prior art voice response system which is partially adapted to work in conjunction with a digital telephone network.

As in FIG. 1, shown are a VPU 110, CODEC 112, MODEM 114, analog line 118, CODEC 128, digital lines 126, 132, CODECs 124, 130, analog lines 134, 136, telephone instrument 138, MODEM 140 and digital computer 142. The telephone network 120 contains CODECs 124, 128, 130 as before, but CODEC 122 of FIG. 1 is missing. Instead, digital line 126 is brought out from CODEC 124 and coupled directly to VPU 110, allowing VPU 110 to communicate directly with the digital telephone network 120 via digital line 126. In this way, voice transmitted from telephone instrument 138 to VPU 110 goes through only one analog to digital conversion, rather than the three conversions of the exemplary system of FIG. 1. However, in all other respects, the system shown in FIG. 2 is identical to that shown in FIG. 1.

Figure 3:
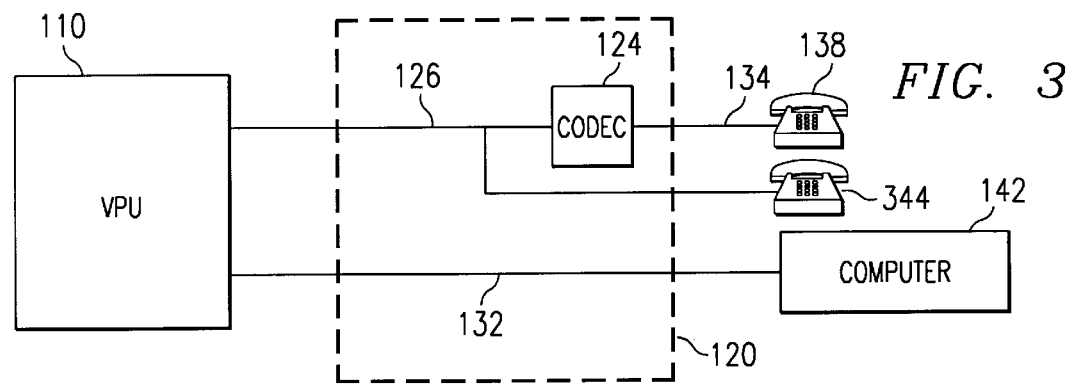
FIG. 3 is a block diagram of the voice response system of the present invention fully adapted for use with a digital telephone network.

FIG. 3 shows the voice response system of the present invention which operates fully in conjunction with a digital telephone network.

Shown is a VPU 110, coupled to the digital telephone network 120 via digital lines 126, 132. A single CODEC 124 allows communication by the digital telephone network to those customers having analog telephone instruments 138, which may include facsimile machines and computers, via analog lines 134. Customers possessing digital telephone instruments 344 can communicate directly in digital form by digital line 126 with the digital telephone network 120. Such digital instruments 344 and, for that matter, all data transmitted on digital lines 126, 132 are typically in a standard ISDN format, a standard in the industry. It should be understood, however, that use of the present invention is not restricted to transmission of digital data in the ISDN format, but is adaptable to any digital data transmission protocol. It should also be clearly understood that digital lines 126, 132 may be separate channels on a single digital trunk line. In fact, in the preferred embodiment of the present invention, lines 126, 132 are two channels in a T1 trunk. In this manner, a single trunk line can serve as the medium for the two required digital communication paths.

It can be clearly seen in FIG. 3 that only one analog to digital conversion is needed (via CODEC 124). All other communication occurs in its pure digital form, such as that between VPU 110 and computer 142. In fact, if a person has a digital instrument 344, digital conversion occurs in the instrument itself, thus no subsequent conversion is necessary, thereby preserving maximum efficiency, speed and fidelity of transmission. If the VPU 110 receives data in the form of tones or pulses from the digital instrument 344, no conversion whatsoever takes place, thereby preserving total signal fidelity.

The examples above have illustrated a case of a person wishing to know an account balance, thereby placing an inbound call to the system. However, such systems are fully designed to be used in conjunction with outbound applications, wherein calls are placed to persons and input from the persons solicited in response to questions voiced by the VPU. Thus, the scope of the present invention is not limited to inbound applications.

Figures 4, 6:
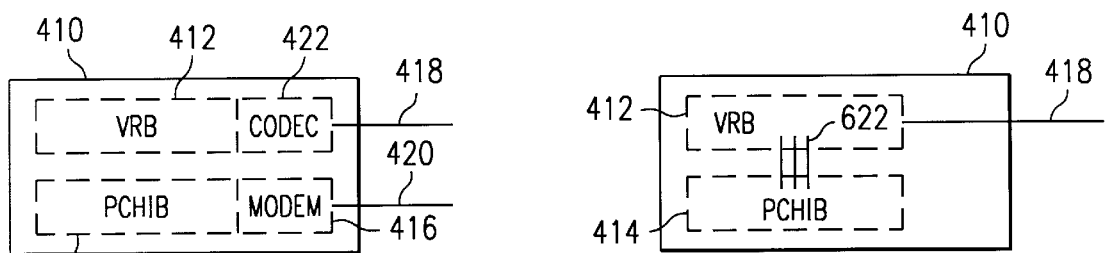
FIG. 4 is a block diagram of a prior art voice response unit for use in conjunction with the prior art system of FIG. 1.
FIG. 6 is a block diagram of the voice response unit of the present invention adapted for use with the system of FIG. 3.

FIG. 4 is a block diagram of the prior art VPU 110 of FIG. 1. The VPU 110 of FIG. 1, in the preferred embodiment of the prior art system, was designed to operate in conjunction with a personal computer in the form of a plurality of daughter boards attachable to a personal computer mother board by a common data and address bus. Accordingly, shown in representational form is a mother board 410 having coupled thereto a pair of daughter boards representing a voice response board ("VRB") 412 and a personal computer host interface board ("PCHIB") 414. The PCHIB 414 connects to a MODEM 416 and communicates via an analog line 420 to a telephone network (not shown). The VRB 412 connects to a CODEC 422 and communicates via an analog line 418 to the telephone network (not shown). In such an architecture, the VRB 412 and the PCHIB 414, being both daughter boards, must communicate via the mother board 410 bus to transmit data therebetween.

Figure 5:
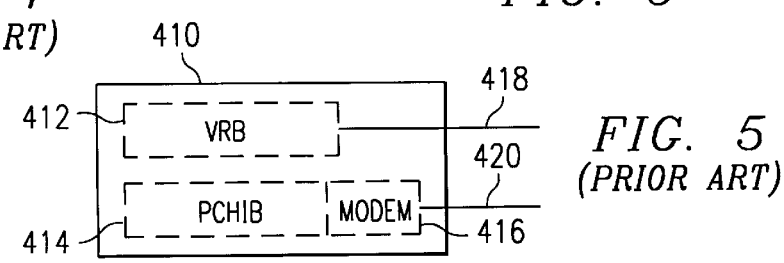
FIG. 5 is a block diagram of a prior art voice response unit for use in conjunction with the prior art system of FIG. 2.

FIG. 5 is a block diagram of the prior art VPU 110 of FIG. 2. The VPU 110 of FIG. 2, in the preferred embodiment of the prior art system, and as in FIG. 4, was designed to operate in conjunction with a personal computer in the form of a plurality of daughter boards attachable to a personal computer mother board by a common data and address bus. Accordingly, shown in representational form is a mother board 410 having coupled thereto a pair of daughter boards representing a voice response board ("VRB") 412 and a PCHIB 414. The PCHIB 414 connects to a MODEM 416 and communicates via an analog line 420 to a telephone network (not shown). The VRB 412 communicates via a digital line 418 to the telephone network (not shown). Thus, the need for the CODEC 422 of FIG. 4 has been eliminated.

Turning now to FIG. 6, which details the VPU 110 of the present invention shown in FIG. 3, it can be clearly seen that the disadvantages inherent in the VPU of FIG. 4 have been obviated. Again, a mother board 410 supports a VRB 412 and PCHIB 414. Communication to the telephone network is provided via a single digital line 418 coupled to the VRB 412. Communication between the VRB 412 and the PCHIB 414 is provided by a bus 622 coupling the VRB 412 to the PCHIB 414. The bus 622 allows the personal computer host interface board 414 to communicate through the VRB 412 as if it were a MODEM, permitting the PCHIB 414 to interface with software running in the personal computer (not shown) without modification. The software retains the ability to use standard communication protocols developed for communication by MODEM (X.25, for instance). The difference, however, between the VPU of FIG. 6 and the VPUs of FIGS. 4 and 5 is that, in FIG. 6, the personal computer host interface 414 communicates to the computer (not shown, but referenced as 142 in FIG. 3) via the digital line 418 and the VRU 412, thereby taking advantage of the capability of the digital line 418. This is a key point of novelty in the present invention.

Although the present invention and its advantages have been described in detail, it should be understood that various changes, substitutions and alterations can be made herein without departing from the spirit and scope of the invention as defined by the appended claims.

What is claimed is:

1. A circuit for interconnecting a data communications processor and a communication line, the circuit comprising:
   an interactive network interface for receiving and transmitting digital data over at least one channel of the communication line and for communicating the data to and from the data communications processor; and
   a digital multichannel telecommunications bit rate bus linking the interactive network interface to the data communications processor for the passage of the data therebetween;
   wherein the processor treats the interface as a modem during communication therewith.

2. The circuit set forth in claim 1, wherein the data communications processor provides certain layers of industry standard data communication protocols.

3. The circuit set forth in claim 2, wherein the protocols include X.25 telecommunications protocols.

4. The circuit set forth in claim 1, wherein the communication line is a trunk having a plurality of channels.

5. The circuit set forth in claim 4, wherein the trunk is a T1 trunk.

6. The circuit set forth in claim 5, wherein the T1 trunk utilizes ISDN primary rate interface signalling.

7. The circuit set forth in claim 4, wherein the trunk is an E1 trunk.

8. The circuit set forth in claim 7, wherein the E1 trunk utilizes ISDN primary rate interface signalling.

9. The circuit set forth in claim 1 wherein the bit rate is at least 64 k bits per second for each channel of the bus.

10. The circuit set forth in claim 1 wherein the bit rate is a multiple of 64 k bits per second for each channel of the bus.

11. The circuit set forth in claim 1, wherein:
    the data communications processor is a first daughter board coupled to a motherboard; and
    the interactive network interface is a second daughter board coupled to the motherboard.

12. The circuit set forth in claim 1, wherein:
    the data communications processor is a daughter board coupled to a motherboard.

13. The circuit set forth in claim 1, wherein:
    the interactive network interface is a daughter board coupled to a motherboard.

14. A communications system for moving digital data from a first processor to a second processor, one of the processors having connected thereto a circuit for controlling the movement of the data, the circuit comprising:
    a network interface for bi-directionally moving digital data over at least one channel of a communication line and for moving the data to and from the one processor having the data controlling circuit connected thereto; and
    a digital multichannel telecommunications bit rate bus linking the network interface to the one processor for the movement of the data therebetween;
    wherein the one processor treats the interface as a modem during communication therewith.

15. The communications system set forth in claim 14, wherein the multichannel bus carries a bit rate of at least 64 k bits per second on each channel.

16. The communications system set forth in claim 14, wherein the bus carries one or more layers of an industry standard telecommunications protocol as controlled by the one processor.

17. The communications system set forth in claim 14, wherein the communication line is a trunk having a plurality of channels.

18. The communications system set forth in claim 17, wherein the trunk is a T1 trunk.

19. The communications system set forth in claim 18, wherein the T1 trunk utilizes ISDN primary rate interface signalling.

20. The communications system set forth in claim 17, wherein the trunk is an E1 trunk.

21. The communications system set forth in claim 20, wherein the E1 trunk utilizes ISDN primary rate interface signalling.

22. The communications system set forth in claim 14, wherein:
    said one of the processors is a first daughter board coupled to a motherboard; and
    the network interface is a second daughter board coupled to the motherboard.

23. The communications system set forth in claim 14, wherein:
    said one of the processors is a daughter board coupled to a motherboard.

24. The communications system set forth in claim 14, wherein:
    the network interface is a daughter board coupled to a motherboard.

25. A voice processing unit, comprising:
    a motherboard having a processor and a standard PC bus;
    a voice response board coupled to the motherboard via the PC bus and coupled to a telecommunications network;
    an interface board coupled to the motherboard via the PC bus; and
    a digital multichannel telecommunications bit rate bus linking the voice response board and the interface board, the digital bus supporting industry standard telecommunication protocols.

26. The voice processing unit of claim 25, wherein the voice response board is in communication with a remote computer system via the telecommunications network.

27. The voice processing unit of claim 25, wherein the telecommunications network comprises at least one channel of a T1 trunk.

28. The voice processing unit of claim 27, wherein the T1 trunk utilizes ISDN primary rate interface signalling.

29. The voice processing unit of claim 25, wherein the telecommunications network comprises at least one channel of an E1 trunk.

30. The voice processing unit of claim 29, wherein the E1 trunk utilizes ISDN primary rate interface signalling.

31. The voice processing unit of claim 25, wherein the protocol supports data transmission of 64 k bits per second.

32. The voice processing unit of claim 25, wherein the protocol supports the transmission of data of at least 64 k bits per second and multiples thereof.

33. The voice processing unit of claim 25, wherein each channel of the bus is capable of processing data of at least 64 k bits per second.

34. The voice processing unit of claim 33, wherein the telecommunications network comprises a multichannel digital telephone trunk.

35. The voice processing unit of claim 34, wherein the telecommunications network is a T1 trunk.

36. The voice processing unit of claim 35, wherein the T1 trunk utilizes ISDN primary rate interface signalling.

37. The voice processing unit of claim 34, wherein the telecommunications network is an E1 trunk.

38. The voice processing unit of claim 37, wherein the E1 trunk utilizes ISDN primary rate interface signalling.

39. The voice processing unit of claim 25, wherein the voice response board receives a signal from a caller via the telecommunications network and wherein the voice processing unit responds to the signal with data retrieved over the digital bus from the processor via the interface board and the voice response board.

40. The voice processing unit of claim 39, wherein the data is presented to the caller in voice form.

41. The voice processing unit of claim 25, wherein the telecommunications network includes at least a part of a public communications network.

42. The voice processing unit of claim 25, wherein:
the interface board treats the voice response board as a modem during communication therewith.

43. The voice processing unit of claim 25, wherein:
the voice response board is a first daughter board; and
the interface board is a second daughter board.

44. The voice processing unit of claim 25, wherein:
the voice response board is a daughter board.

45. The voice processing unit of claim 25, wherein:
the interface board is a daughter board.

46. A computer system having a motherboard having a bus, the computer system comprising:

a voice response board coupled to the bus, the voice response board adapted to communicate with a remote computer system via a digital link; and a host interface board coupled to the bus and also coupled to the voice response board via a digital multichannel telecommunications bit rate protocol bus.

47. The computer system of claim 46, wherein software executing on the computer system communicates with the remote computer system using standard telecommunications protocols operating in at least the 64 k bit per second range and multiples thereof.

48. The computer system of claim 46, wherein the computer system comprises a voice response system.

49. The computer system of claim 46, wherein the voice response board receives a signal from a caller via the digital link and wherein the computer system responds to the signal with data retrieved from the remote computer system over the digital link.

50. The computer system of claim 49, wherein the data is presented to the caller in voice form.

51. The computer system of claim 46, wherein the digital link comprises a multichannel digital telephone trunk.

52. The computer system of claim 51, wherein the digital link is a T1 trunk.

53. The computer system of claim 52, wherein the T1 trunk utilizes ISDN primary rate interface signalling.

54. The computer system of claim 51, wherein the digital link is an E1 trunk.

55. The computer system of claim 54, wherein the E1 trunk utilizes ISDN primary rate interface signalling.

56. The computer system of claim 46, wherein the digital link comprises at least part of a public communications network.

57. The computer system of claim 46, wherein:
the interface board treats the voice response board as a modem during communication therewith.

58. The computer system of claim 46, wherein:
the voice response board is a first daughter board; and
the host interface board is a second daughter board.

59. The computer system of claim 46, wherein:
the voice response board is a daughter board.

60. The computer system of claim 46, wherein:
the host interface board is a daughter board.

* * * * *